INVENTOR.
GEORGE E. ROBBINS
BY Robert W. Beach
ATTORNEY

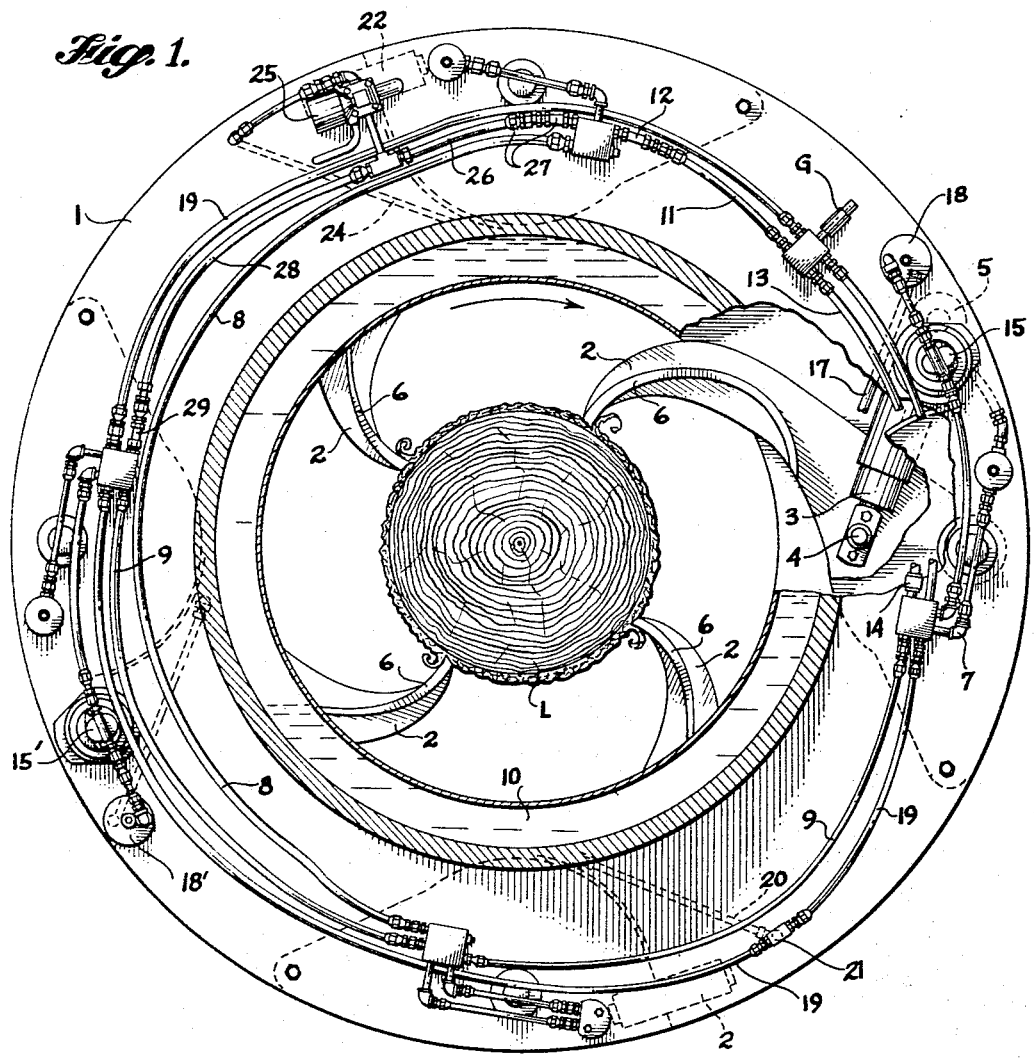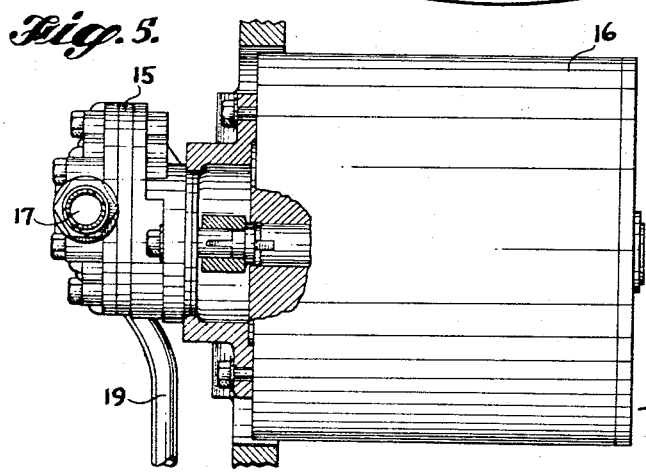

Aug. 1, 1967
G. E. ROBBINS
3,333,615
REMOTELY CONTROLLABLE FORCE MECHANISM FOR
ROTARY-RING LOG BARKERS
Filed June 20, 1966
8 Sheets-Sheet 3
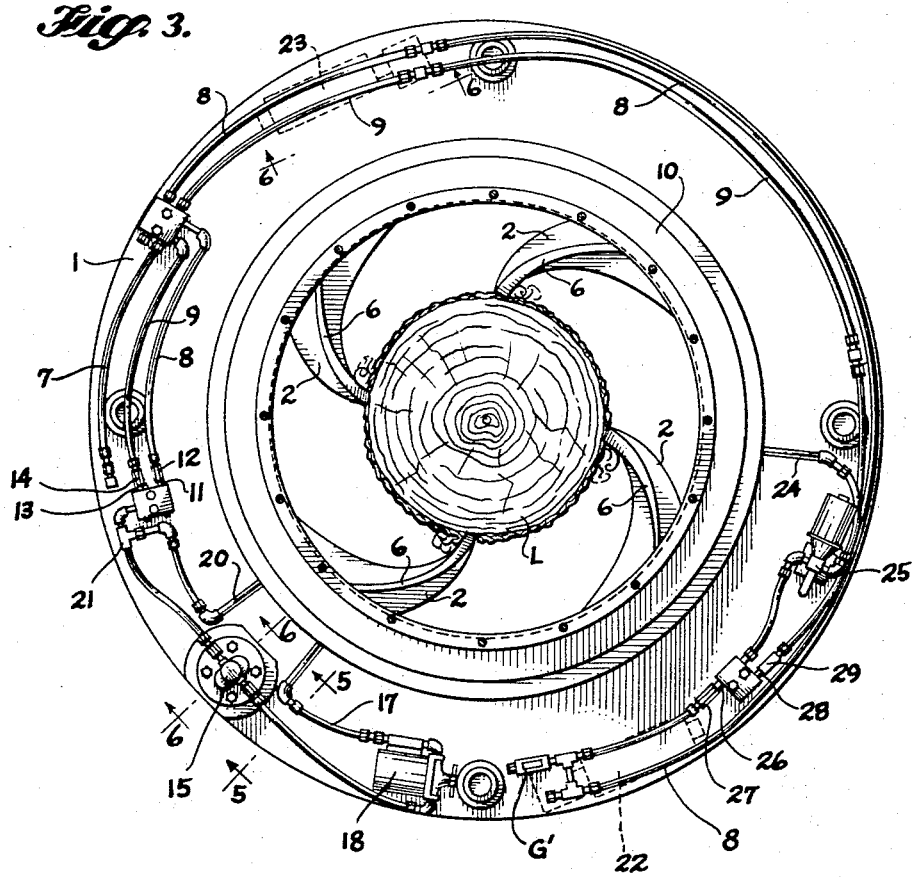
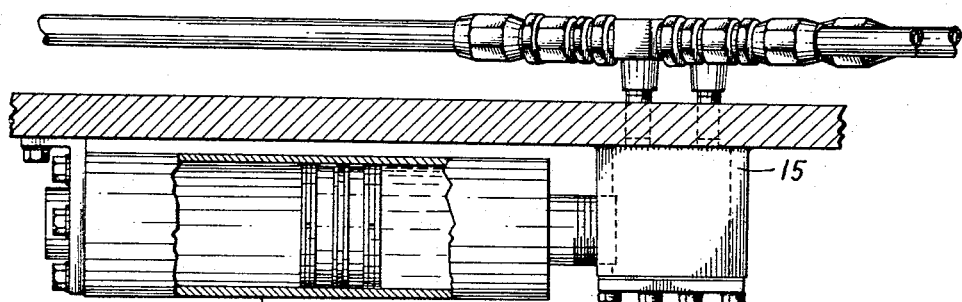
INVENTOR.
GEORGE E. ROBBINS
BY
*Robert W. Beach*
ATTORNEY Aug. 1, 1967  G. E. ROBBINS  3,333,615
REMOTELY CONTROLLABLE FORCE MECHANISM FOR
ROTARY-RING LOG BARKERS
Filed June 20, 1966  8 Sheets-Sheet 4

INVENTOR.
GEORGE E. ROBBINS
BY
Robert W. Beach
ATTORNEY

Aug. 1, 1967

G. E. ROBBINS 3,333,615

REMOTELY CONTROLLABLE FORCE MECHANISM FOR
ROTARY-RING LOG BARKERS

Filed June 20, 1966

INVENTOR.
GEORGE E. ROBBINS
BY
Robert W. Beach
ATTORNEY

Aug. 1, 1967  G. E. ROBBINS  3,333,615
REMOTELY CONTROLLABLE FORCE MECHANISM FOR
ROTARY-RING LOG BARKERS
Filed June 20, 1966  8 Sheets-Sheet 7

INVENTOR.
GEORGE E. ROBBINS
BY
Robert W. Beach
ATTORNEY

INVENTOR.
GEORGE E. ROBBINS
BY
Robert W. Beach
ATTORNEY 3,333,615
REMOTELY CONTROLLABLE FORCE MECH-
ANISM FOR ROTARY-RING LOG BARKERS
George E. Robbins, Tacoma, Wash., assignor to Nichol-
son Manufacturing Company, Seattle, Wash., a corpo-
ration of Washington
Filed June 20, 1966, Ser. No. 558,798
10 Claims. (Cl. 144—208)

This application is a continuation-in-part of my United States patent application Serial. No. 331,489, filed Dec. 18, 1963, for Remotely Controllable Force Mechanism for Rotary-Ring Log Barker, which has become abandoned.

This invention relates to mechanism enabling the force exerted by a barking arm of a rotary-ring log barker on a log to be controlled remotely while eliminating disadvantages of prior rotary-ring log barker constructons.

A representative type of rotary-ring log barker is shown in Nicholson United States Patent 2,802,495 for Swiveled-Scraper-Plate Rotary-Ring Log Barkers. In this type of rotary-ring log barker the pressure exerted on a log by a barking arm mounted on the rotary ring for movement of its inner barking end toward and away from a log extending through the barking ring is capable of being controlled by varying the pressure in pneumatic arm actuators. Air is supplied to such actuators from the stationary part of the log barker so that it is necessary to provide pneumatic sealing structure between the rotary ring and the stationary portion of the barker. Such an expedient presents the problem of providing satisfactory air sealing structure between relatively rotating parts, which constitutes a difficult problem. The necessity for such pneumatic sealing mechanism is obviated by the present invention.

It is a principal object of the present invention to provide fluid-operated mechanism for varying the force exerted by the barker arm of a rotary-ring log barker, which is self-contained on the rotary ring and is remotely controllable by electric control mechanism. It is an incidental object to enable the components of the fluid-pressure controlling mechanism to be of rigid construction and to be connected by rigid piping carried by the rotary barking ring so as to minimize maintenance problems.

A further object is to provide actuators for a plurality of barker arms which are interconnected to equalize the forces exerted by such arms.

Another object is to provide mechanism for controlling the force exerted by barking arms in which the force can be adjusted by either increasing or decreasing such force while the rotary ring is rotating during a log barking operation.

It is also an object to provide mechanism which will enable the force exerted by the barking arms to be increased or decreased quickly, and in this connection it is an object to provide a plurality of pumps in the ring-carried system to expedite an arm force increase.

A more specific object is to provide components of such a ring-carried arm force-varying system which can be mounted conveniently on a rotary barker ring in distributed fashion, so as to avoid unbalancing appreciably the rotary mechanism.

In accomplishing the foregoing objects a hydraulic actuator can be provided for each barking arm, all of which actuators can be interconnected, or if barking arms are disposed directly opposite each other the actuators of such opposite arms can be connected so that the force exerted on the log will always be substantially balanced. Variation in hydraulic pressure can be afforded in the hydraulic arm-actuator system by connecting one or more pneumatic accumulators in such system. For any selected position of the barking arms the pressure in the system can be altered by a pump for supplying additional hydraulic liquid to the system from a hydraulic liquid reservoir or the pressure of such system can be decreased by actuating a control valve through which hydraulic liquid can be returned from the system to the reservoir. All of this fluid system is mounted on the rotary ring and a pump or pumps are driven either by electricity supplied to the rotary ring through slip rings, or by the rotation of the ring itself relative to a stationary portion of the barker. Also a valve or valves are controlled by electricity supplied to the rotary ring through slip rings or a magnet control which preferably is electrically actuated. The supply of electricity to such slip rings can be controlled to energize the hydraulic pump or to effect opening of the return valve selectively at will.

FIGURE 1 is an elevation of the rotary ring of a rotary-ring log barker with parts broken away.

FIGURE 3 is an elevation of a rotary ring having a modified type of system for varying the force on the log barking arms.

FIGURE 5 is an elevation of an electrically driven pump component of the system shown in FIGURE 3, as seen from line 5—5 of that figure and having parts broken away, and FIGURE 6 is an elevation of an accumulator as seen from line 6—6 of FIGURE 3, parts being broken away.

Figure 2:
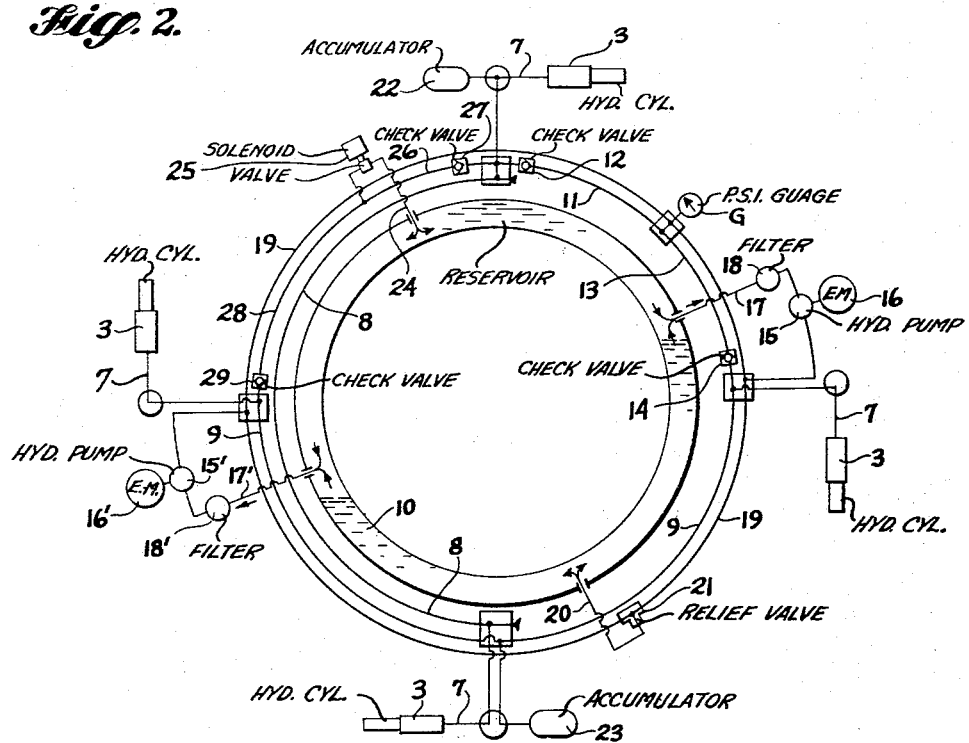
FIGURE 2 is a diagrammatic elevation of such a rotary ring illustrating the manner in which components of the system are interconnected.

The ring 1 of the log barker is suitably mounted for rotation in a counterclockwise direction, as indicated by the arrow in FIGURE 1. The log L is supported and guided for movement lengthwise and nonrotatively by suitable conveyor mechanism in a position substantially concentrically of the ring. Log barking arms 2 are mounted on the ring for movement toward and away from its central portion so that their inner barking ends can engage the surface of the log to scrape bark from it. The end of each arm 2 constitutes a scraper blade or plate. It is preferred that each barking arm be supported by a pivot for swinging of its inner end toward and away from the center of the barking ring. As shown in FIGURES 1 and 3, four of such arms can be provided spaced equal distances circumferentially of the ring so as to equalize the pressure of the barking ends of the arms on the log.

A fluid-pressure actuator 3 is connected by a pivot 4 to each arm and by a pivot 5 to the ring. Such arm actuator is shown as a hydraulic piston and cylinder jack, normally exerting pressure on the pivot 4, tending to swing the barking end of the arm inward. Each arm has an edge 6 at the side toward which the log is fed. Such edge is shaped so that pressure of the log against it, accompanied by rotation of the ring 1, will wedge the arm outward in opposition to the pressure exerted on the arm by the actuator 3 until the barking end of the arm passes onto the periphery of the log. Such a rotary-ring log barker having swingable arms pressed inwardly by hydraulic jack actuators and provided with an arm-opening log-engaging edge is known and these features are not part of the present invention.

In barking logs the aim is to remove all of the bark from a log cleanly with as little abrasion of the wood beneath the bark as possible. The thickness and adherence to the wood of bark varies with the size of log, the species of tree, the period of time which has elapsed since the tree was cut and other factors. Consequently, it is necessary to vary the force with which the barking arm blade is pressed against a log in order to accomplish the most effective barking operation. The most advantageous application of force may vary from one log to another in the same batch, and frequently the most effective degree of force of a barking arm can be selected only after the operation of barking a particular log has actually been initiated. It may then be desirable to increase or decrease the force exerted on the barking arms to accomplish the most satisfactory barking operation.

The hydraulic liquid for operating the jacks 3 is supplied to the hydraulic cylinders of such jacks by the pipes 7. In the installation shown in FIGURES 1 and 3 the hydraulic liquid supply pipes for the opposite jacks are connected in pairs. Thus, with the ring in the particular rotative position shown diagrammatically in FIGURE 2 the pipes 7 for the upper and lower jack hydraulic cylinders are connected by a header 8, while the pipes 7 for the left and right jack hydraulic cylinders are connected by the header 9. Such pipe connection arrangement will insure that, even though there may be some imbalance in the system for some reason, the forces exerted on a log by opposite arms will always be equal.

Liquid under pressure is supplied to the header 8 from an annular hydraulic reservoir 10, arranged concentrically with the barking ring 1 and mounted on it, through a supply pipe 11 and past a check valve 12. Simultaneously, hydraulic liquid under pressure is supplied to the header 9 through the supply pipe 13 past the check valve 14. Because the supply pipes 11 and 13 are isolated from their respective headers 8 and 9 by the check valves 12 and 14, loss of pressure in the system of one header for any reason would not cause loss of pressure in the other header system. Pressure is created in the supply pipes 11 and 13 to the extent indicated by the pressure gauge G, which may be located remotely from the barking ring, by hydraulic pumps 15 and 15' driven by electric motors 16 and 16', respectively. These pumps and motors are mounted on the barking ring in substantially diametrically opposite positions to maintain the static and dynamic balance of the ring.

The pumps 15 and 15' draw hydraulic liquid from the reservoir 10 through outflow pipes 17 and 17', in which filters 18 and 18' are located. Both of these pumps discharge the liquid to line 19 interconnecting the discharge ports of the two pumps. For safety line 19 is connected to a return pipeline 20 emptying into the reservoir 10. Flow through this pipeline is controlled by a high pressure relief valve 21, which would prevent an excessively high value of hydraulic pressure being imposed on the headers 8 and 9 past the check valves 12 and 14.

With each jack hydraulic cylinder 3 is associated pneumatic accumulator means which will enable the volumetric capacity of each jack system to be varied by movement of the jack's hydraulic cylinder and piston without the volume of liquid in such system being changed. In the arrangement shown in FIGURE 2 one accumulator 22 is provided for the upper and lower hydraulic jacks, and a second accumulator 23 is provided for the left and right hydraulic jacks. Such accumulators are shown as being mounted on the barking ring 1 in diametrically opposite positions, again to preserve the static and dynamic balance of the ring assembly. It will be observed that the upper accumulator 22 is connected directly to the header 8 and the lower accumulator 23 is connected directly to the header 9.

If the hydraulic pressure in the system is higher than desired hydraulic liquid can be returned from either of the headers 8 and 9, and the jack's supply pipes 7 connected respectively to them, through the return pipe 24 to the reservoir 10. Control of such return flow is effected by the electrically-actuated solenoid valve 25. Pipe 26 connected to valve 25 and header 8 has a check valve 27 interposed in it, and pipe 28 connecting header 9 and the solenoid valve has a check valve 29 interposed in it. The purpose of these check valves, like that of check valves 12 and 14, again is to isolate the systems of the two headers 8 and 9 while providing a common return line to the reservoir 10 and a control common to both systems.

Normally manipulation of solenoid valve 25 will reduce the pressure in both header systems simultaneously and to the same extent, but if a leak should occur in one of the systems the check valve 27 or 29 will prevent liquid from passing from one header system to the other through the lines 26 and 28. Such safety arrangement serves the double purpose of enabling two opposite barking arms to exert equal barking forces on the log even though the pressure-creating system for the other two arms should fail, and if a leak should occur in one of the header systems the loss of hydraulic liquid will be restricted to that in such system, rather than the hydraulic liquid being lost from both header systems.

Figure 4:
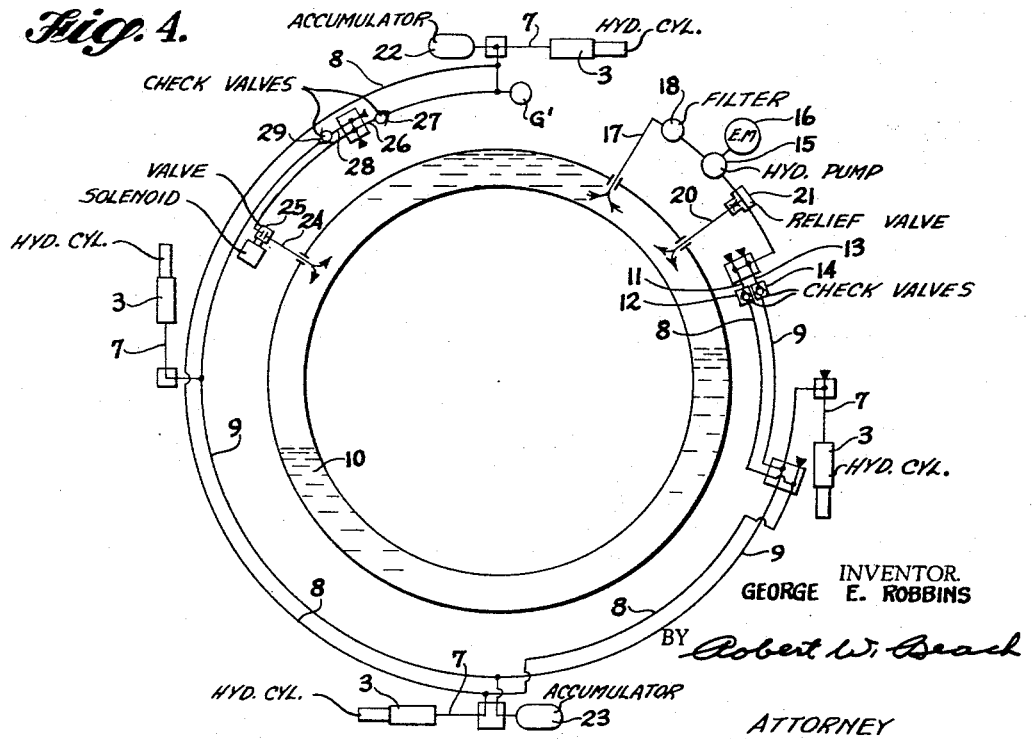
FIGURE 4 is a diagrammatic elevation of such a barking ring showing components of the system and the manner in which they are connected.

In FIGURES 3 and 4 a somewhat different system is shown in which a single pump 15 is provided and such pump is close-coupled to the header systems for the two sets of opposite arms, instead of two pumps being provided. Alternatively, in the system of FIGURES 1 and 2, so that either or both pumps could be employed to pressurize the system. Although the piping arrangement shown in FIGURE 4 is somewhat different from that shown in FIGURE 2 the components for the most part are directly comparable and consequently have been numbered correspondingly. In this instance the pressure gauge G' is connected to the header system 8 on the assumption that the pressures in the two header systems will be equal. If the pressure in the header system 8 should drop because of a failure in such system such equality would not be maintained, but during the normal operation of the force-producing apparatus the pressures in the two systems would be equal to each other and to the pressure in the pump discharge pipes 11 and 13.

As has been stated above, the hydraulic pumps 15 and 15' are driven by electric motors 16 and 16', respectively, mounted on the rotary barking ring 1. Also, the electrically controlled force-reducing solenoid valve 25 is mounted on the barking ring. In order to provide remote energization and control for these components it is necessary to have rotary control means between the rotary ring 1 and the rotary-ring mount, such as the electrical connections shown in FIGURES 7, 8 and 9. The manner in which the electrical components of the system are connected electrically is illustrated in FIGURE 10.

The pump driving motors 16 and 16' are connected by wires 30 through rotary slip rings 31. Preferably three of such wires and thre slip rings are provided to enable the motor 16 to be of the three-phase alternating current type. The valve solenoid 25 includes one wire 32 connected to the neutral wire 30 for the motor 16, and a second wire 33 connected to a separate slip ring 34. The two outer wires 35 and the neutral wire 36 of the alternating current three-wire circuit are connected to brushes 37 in engagement with the three rings 31, respectively, and a brush 38 is in engagement with the fourth slip ring 34.

Electric current is supplied for driving the motors 16 and 16′ and energizing the control solenoid 25 from a suitable three-phase alternating current power source 39. Such power source is connected to the system by a master switch 40. Control of the system is accomplished remotely by an operator manipulating a control circuit system powered by electric current from a 110-volt control current supply 41. In this circuit is provided a main switch 42 of the sustained contact type, which energizes a relay 43 operable to close the main switch 44 for the three wires of the three-phase circuit. The pump motor switch 45 is operated by the relay 46, and the force-reducing solenoid valve is controlled by the solenoid switch 47 actuated by the relay 48.

In order to simplify the operation of the control mechanism by the operator it is preferred that time-delay mechanism be provided which will effect a predetermined increment of pressure increase or pressure decrease without further control on the part of the operator. Thereafter the opeator may increase or decrease the pressure to any desired extent. Such timed pressure adjustment is effected by the time-delay relay 51 and the switch 52, while the subsequent supplemental adjustment, either in the same direction or in the opposite direction, can be accomplished by manual operation of the switch 53. The switch 50 simply energizes the circuit 54 to the relay 51 and instantaneously the circuit 55 feeding the switch 52. If the switch handle 49 has been moved into the upper position, switch 52 will energize the circuit 56 connected to the relay 46, which energizes the pump motor or motors. Alternatively, if the switch handle 49 has been moved downward the switch 52, through the circuit 55, will have energized circuit 57 connected to the pressure-reduction valve control relay 48. The circuit through switch 52 will continue to be energized throughout the time delay period between energization of relay coil 51 and opening of the normally-closed relay switch 51′.

The relay switch arm 51′ controlling circuit 55 is connected to the relay switch arm 51″ controlling normally-open circuit 58, so that at the end of the time delay period the relay switch arms move to break the circuit 55 and complete the circuit 58. This latter circuit is connected to switch 53 so that such switch will be operable after such time delay period but normally will be in the centered position shown, being of the self-centering type. Switch 53 will be ineffective until relay switch 51″ moves to closed position. If this switch is moved manually upward, whether switch arm 49 is in the upper or lower switch-closed position, the circuit 56 will be energized to energize relay 46 for increasing the pressure in the system. Alternatively, if switch 53 is moved downward circuit 57 will be energized to energize relay 48, which in turn energizes the pressure-decreasing valve solenoid 25. When the pressure has thus been adjusted to effect the desired force of the barking arms on the log, switch arm 49 can be returned by the operator to its centered position of FIGURE 10 until the operator desires to relieve the force on the barking arms so that they will open, which can be effected by moving the switch arm 49 downward.

If the switch-actuating arm is moved downward instead of being raised, switch 52 will effect energization of circuit 57 to energize relay 48 for actuating the pressure-decreasing valve solenoid 25. When this valve has remained open for a period of time predetermined by relay 51 this valve will then be closed again, after which switch 53 can be moved at will in one direction or the other, as explained previously, to increase the pressure or decrease the pressure to exactly the value desired.

In FIGURES 5, 6, 7, 8, and 9 details of typical components of the mechanism are shown. In FIGURE 5 a typical pump 15 and its driving motor 16 are shown.

In FIGURE 6 an accumulator of the free piston type is shown which may be used as either the accumulator 22 or the accumulator 23.

Figure 7:
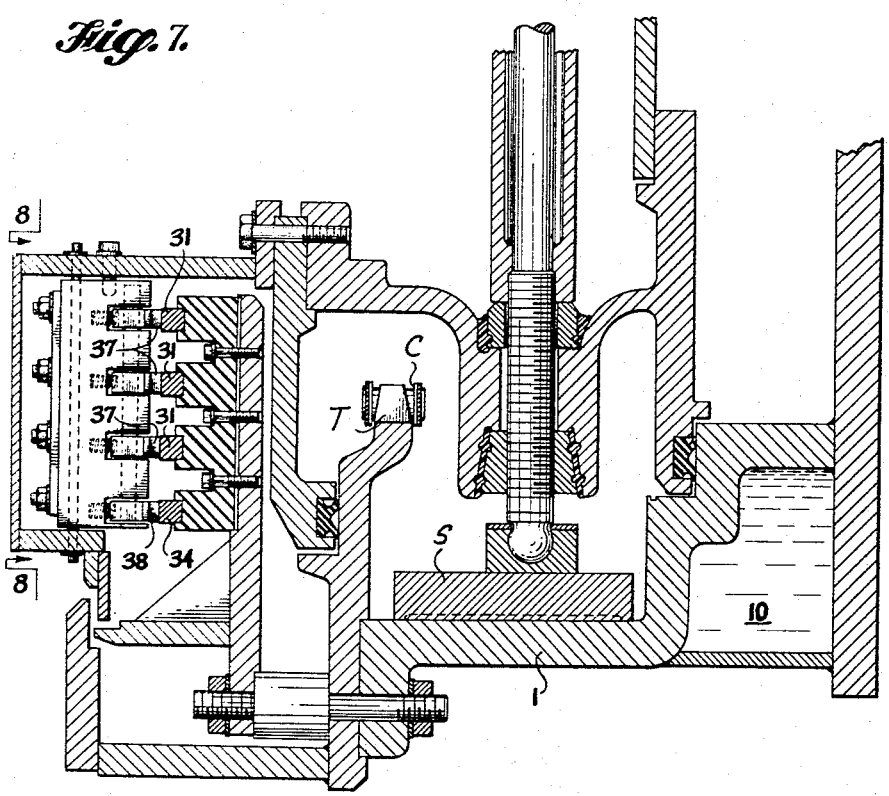
FIGURE 7 is a cross section through a barking ring equipped with the barking arm force-varying system.
Figure 8:
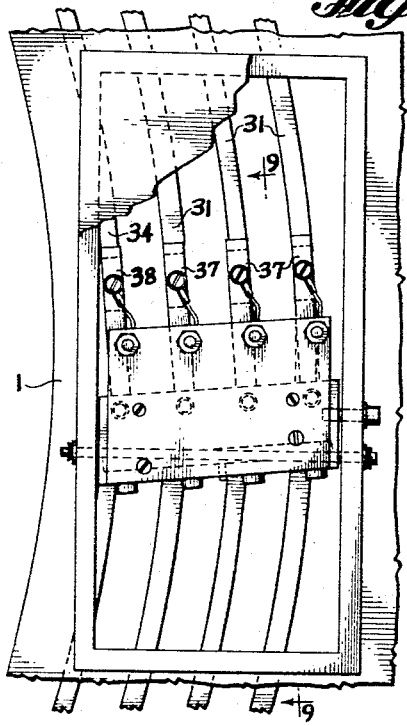
FIGURE 8 is a detail elevation viewed from line 8—8 of FIGURE 7.
Figure 9:
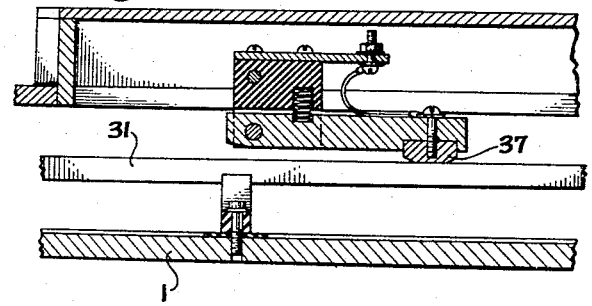
FIGURE 9 is a detail section on line 9—9 of FIGURE 8.
Figure 10:
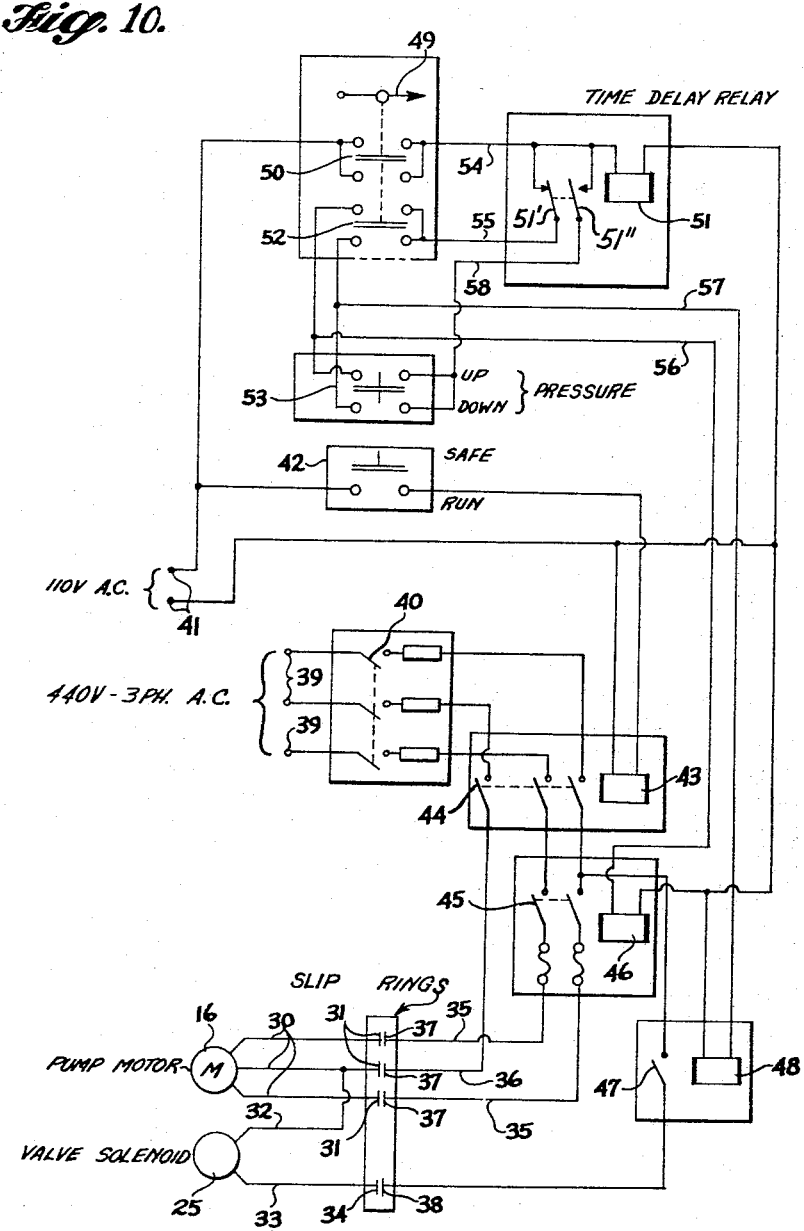
FIGURE 10 is a wiring diagram including slip ring power and control circuits.
Figure 11:
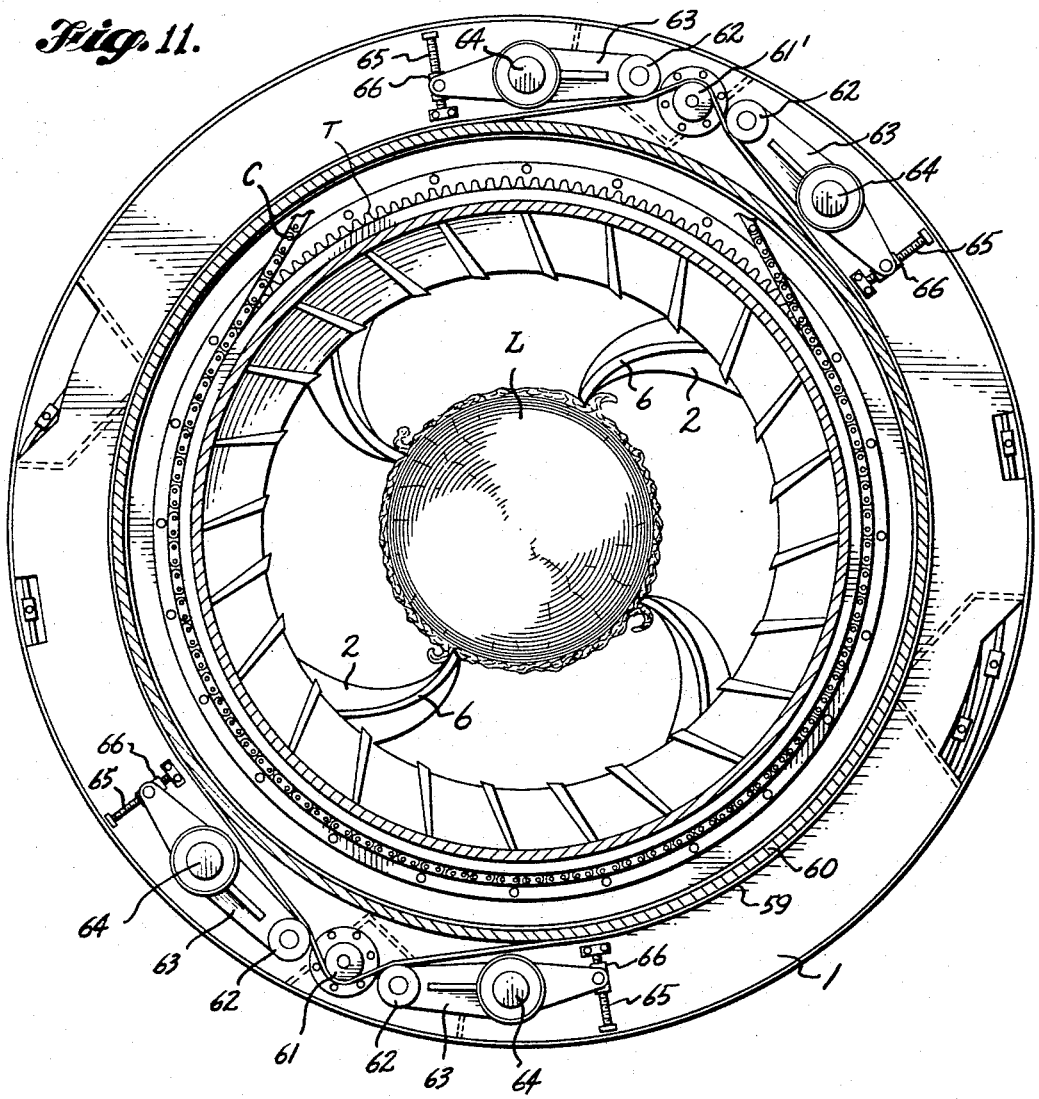
FIGURE 11 is an elevation of one side of the rotary ring of a rotary ring log barker, showing an alternate type of pump driving and control mechanism.

In FIGURES 7, 8 and 9 a typical slip ring and collector brush assembly is shown. The rotary barking ring 1 is held in centered rotating position by shoes S and the ring is rotated by a roller chain C engaging the teeth of sprocket T.

In FIGURES 11 to 15 a different type of drive arrangement is provided for the pumps 15 and 15′ in substitution for the motors 16 and 16′ shown in FIGURE 2. The hydraulic system for the barker shown in these figures can be the same as shown and described in connection with FIGURES 1 and 2. In this instance the pumps are driven by a belt 59 shown in FIGURES 11 and 15, which encircles a stationary flange 60 of the barker. This belt passes over drive pulleys 61 and 61′ at diametrically opposite sides of the barker ring and carried by it. Belt 59 is pressed firmly against the pulleys 61 and 61′ by tightening pulleys 62 engaging portions of the belt closely adjacent to opposite sides of pulleys 61 and 61′.

The tightening pulleys are mounted on the ends of levers 63, swingable about pivots 64. The positions of levers 63 can be adjusted by rotation of screws 65 to move nuts 66 along them. Alternatively, spring pressure devices may be substituted for the screws 65 and nuts 66 to urge radially outward the ends of the levers 63 remote from the tightening pulleys 62 so as to force such tightening pulleys against the belt 59. Such belt contacts the stationary flange 60 over a sufficient circumferential extent of such flange so that the belt does not slide on the flange. Consequently, the pulleys 61 and 61′ will run along under the belt as the barker ring is rotated by the roller chain C engaging the teeth of sprocket T.

Figure 12:
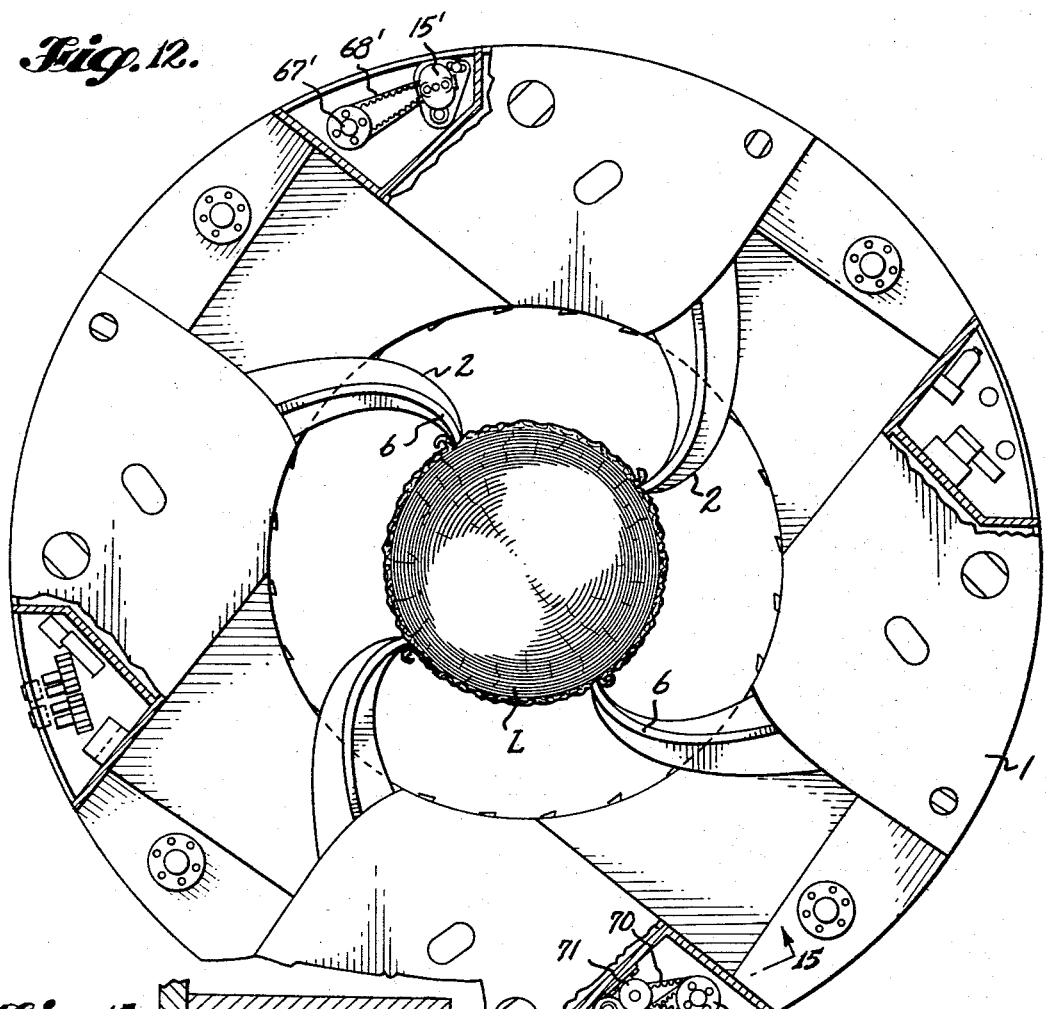
FIGURE 12 is an elevation of the opposite side of such barking ring, parts being broken away.
Figure 15:
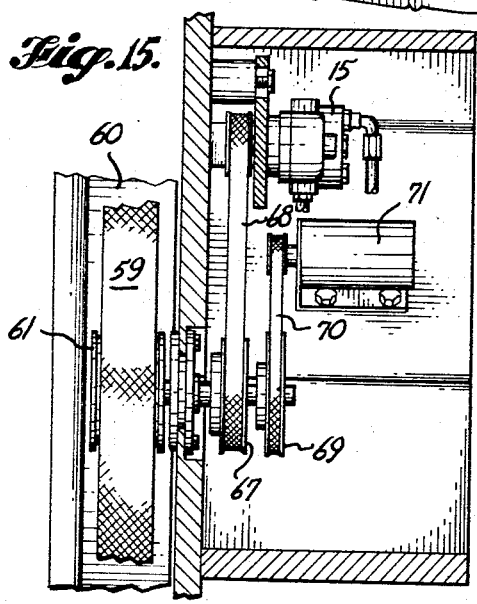
FIGURE 15 is a fragmentary detail cross section through a portion of the mechanism taken on line 15—15 of FIGURE 12.

As shown in FIGURES 12 and 15, rotation of pulleys 61 and 61′ respectively in turn drive pulleys 67 and 67′ with which belts 68 and 68′ respectively are engaged, to drive the pumps 15 and 15′. Also the pulley 61 drives a further pulley 69 with which a belt 70 is engaged to drive a generator 71. Such generator may constitute the power source for operating the solenoids 25 and 25′ of the self-centering control valve shown in FIGURES 13 and 14. The control valve is spring-returned to a central closed position in each instance so as to seal the fluid system which applies pressure to the barker arms. The pressure applied on the log by the arms will remain constant as long as the control valve remains closed.

Opening of the control valve in one direction from a centered position by energization of the solenoid 25 will connect the hydraulic system to the reservoir 10 for effecting a reduction in the hydraulic pressure of the system. The extent of such pressure will depend on the length of time during which the valve is held open by such solenoid. The pumps 15 and 15′ will be driven continuously by the belt drive described above. When the control valve is opened in the opposite direction from its centered position by energization of the solenoid 25′ such valve will connect the barker pressure system to the pump line to increase the pressure in such system. The degree of pressure increase will depend upon the length of time that the solenoid 25′ remains energized.

Figure 13:
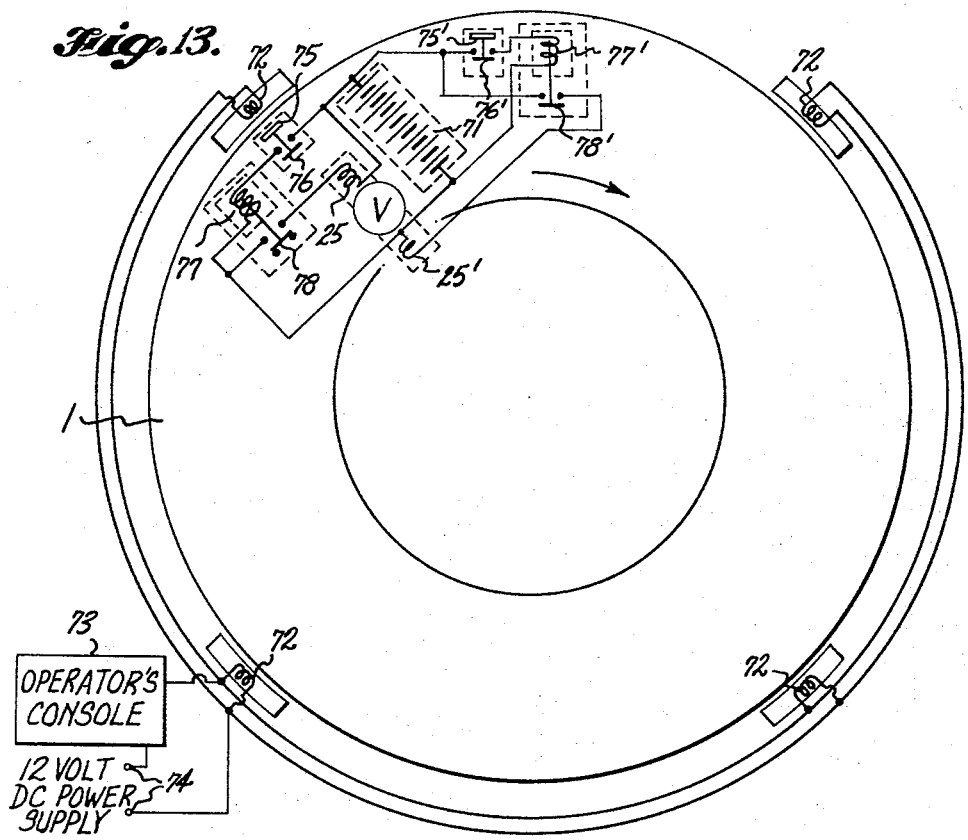
FIGURE 13 is a diagrammatic elevation of a magnetic type of control mechanism.

Energization of the valve solenoids 25 and 25′ shown in FIGURE 13 can be effected electrically by control means operating between the rotary ring 1 and its mount without the provision of slip rings or other conductors between a stationary element and a rotating element. In this case the control means includes one or more electromagnets 72 mounted stationarily adjacent to the barker rotor. These electromagnets can be energized at will by switch means at the operator's console 73 connecting the electromagnets to a direct current power source 74. Such electromagnets are shown as being connected in parallel so that they will all be energized simultaneously by closing of the operator's console switch.

On the ring 1 is a magnet element 75 conected to a switch and operable to effect closing of the switch when such magnet element is attracted by an energized electromagnet 72. The switch 76 is held closed by the magnet element 75 only while it is being attracted by the electromagnet. Closing of this switch effects energization of a short-period holding relay 77, energization of which closes switch 78 to energize the valve solenoid 25. Relay 77 will hold switch 78 closed during rotational movement of the magnet element 75 through an arc of at least 90° from one electromagnet 72 to the next. Consequently, as long as the electromagnet circuit remains closed the relay switch 78 will remain closed to continue energization of the solenoid 25, so that liquid will be draining through the valve from the barker arm pressure system to the reservoir 10. When the switch is released at the operator's console, the electromagnets 72 will be deenergized, so that they will no longer hold the magnet element 75 to maintain switch 76 closed. Consequently, holding relay switch 78 will open, deenergizing the solenoid 25, so that the self-centering valve will be released to close again to seal the arm actuator pressure system for maintaining a lower pressure in it.

In addition to the circuit for energizing valve solenoid 25 a control circuit is mounted on the ring 1 for energizing valve solenoid 25′ to open the valve in the opposite direction for connecting the pressure system to the output line of pumps 15 and 15′. Such solenoid-energizing circuit includes a second magnet element 75′ connected to a second switch element 76′ which controls the circuit through another short period holding relay 77′. Energization of this relay closes switch 78′ for controlling the power supply from the power source 71 to the solenoid 25′ of the control valve. Thus the control circuit for the solenoid 25′ is the same as the control circuit for the solenoid 25, except that the polarity of the magnet element 75′ will be opposite to that of the magnet element 75. The switch at the operator's console 73 for energizing the electromagnets 72 to operate the switch 76′ will apply direct current to the coils of the electromagnets in the direction opposite to that of current in the coils of the electromagnets for energizing the electromagnets to attract magnet element 75.

Thus the operator can operate one switch of the operator's console to supply direct current to the coils of the electromagnets 72 in one direction for attracting the magnet elements 75 to reduce the pressure in the barker arm pressure system and can actuate another switch to supply current to the coils of the electromagnets 72 in the opposite direction for attracting only the magnet element 75′ when he desires to increase the fluid pressure in the barker arm pressure system.

Figure 14:
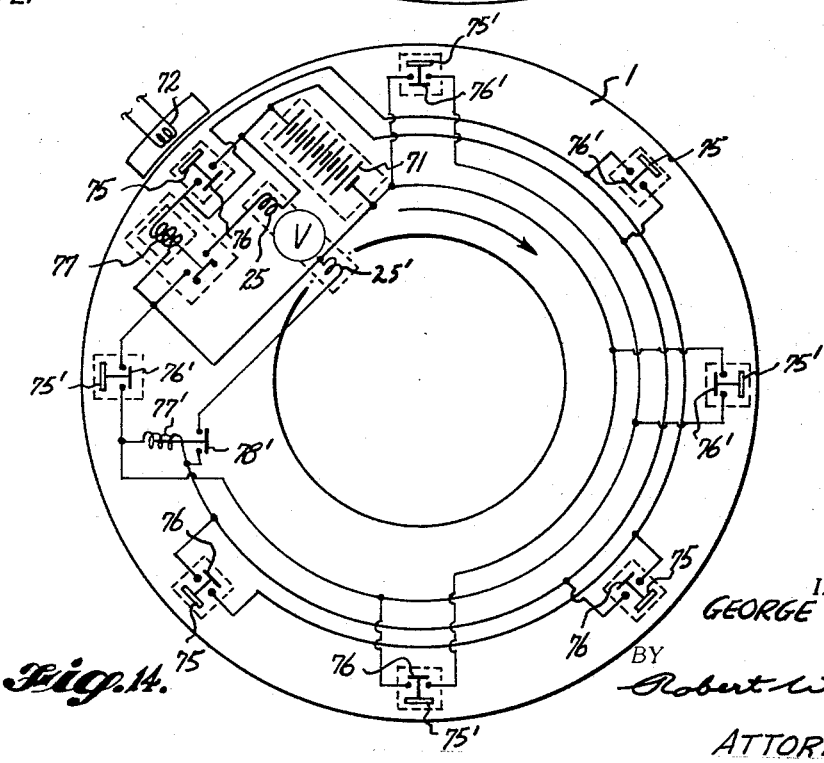
FIGURE 14 is a similar view of an alternate type of magnetic control mechanism.

In FIGURE 14, the control mechanism on the ring or rotor is the same except that, instead of only a single magnet element 75 for controlling valve solenoid 25 and a single magnet element 75′ for controlling valve solenoid 25′, four of each of such magnet elements are provided. The magnet elements 75 are spaced apart 90° and the magnet elements 75′ are spaced apart 90°. The magnet elements 75 are of one polarity and the magnet elements 75′ are of the opposite polarity. The electric control system on the stationary portion of the barker is then modified to provide only one electromagnet 72 and the current direction through the coil of this electromagnet can be reversed so that, by its energization with the current flowing in one direction, only the magnet elements 75 will be attracted into switch-closing position and, when the coil of the electromagnet is energized by direct current flowing in the opposite direction, only the magnet elements 75′ will be attracted into switch-closing position.

With this arrangement it will be seen that the circuit through the short-period holding relay 77 will be completed for each quarter turn of the barker rotor when the electromagnet coil is energized to attract the magnet elements 75. The relay switch 78 will thus be held closed to energize the valve solenoid 25 as long as the electromagnet 72 remains thus energized. If the current through the coil of the electromagnet 72 is reversed in direction, the magnet elements 75 will not be attracted but all of the magnet elements 75′ will be attracted successively as the barker rotor turns. Consequently, the short-period holding relay 77′ will be energized successively each for at least a quarter turn, so that the relay switch 78′ will be held closed to energize the valve solenoid 25′ continuously.

As has been mentioned above, the power source for energizing the relay 77 and the solenoid 25 can be a generator 71 driven mechanically by the belt 59 engaging pulley 61. Alternatively, the power source for such relay and solenoid may be a small battery mounted on the rotary barker ring, so that in such case it would not be necessary to provide the generator.

I claim as my invention:

1. Remotely controllable force mechanism for a rotary-ring log barker having a rotary barking ring and a barking arm mounted on the ring to vary its projection into the ring aperture, comprising yieldable force-exerting means carried by the barking ring and operatively connected to urge the barking arm inward including a fluid-actuated arm actuator, a fluid reservoir and fluid supply means connected between said arm actuator and said reservoir to supply fluid from said reservoir to said arm actuator, electrical control means located remote from the rotary barking ring, and means operatively connecting said electrical control means and said fluid supply means for effecting actuation of said fluid supply means by operation of said electrical control means.

2. The remotely controllable force mechanism defined in claim 1, in which the fluid supply means is electrically controlled, and the means operatively connecting the electrical control means and the fluid supply means are electric.

3. The remotely controllable force mechanism defined in claim 2, in which the electric means operatively connecting the electrical control means and the fluid supply means are electric conducting means.

4. The remotely controllable force mechanism defined in claim 2, in which the electric means operatively connecting the electrical control means and the fluid supply means include electromagnet means and magnetic switch means operable by said electromagnet means.

5. The remotely controllable force mechanism defined in claim 1, in which the fluid supply means are electrically driven.

6. The remotely controllable force mechanism defined in claim 1, in which the fluid-actuated arm actuator is a hydraulic actuator, the fluid reservoir is a hydraulic liquid reservoir, and pneumatic accumulator means connected to the arm actuator.

7. Remotely controllable force mechanism for a rotary-ring log barker having a frame, a barking ring rotatably mounted therein, and a barking arm mounted on the ring to vary its projection into the ring aperture, comprising yieldable force-exerting means carried by the barking ring and operatively connected to urge the barking arm inward including a fluid-actuated arm actuator, a fluid reservoir and electrically-driven fluid supply means connected between said arm actuator and said reservoir to supply fluid from said reservoir to said arm actuator, electrical control means located remote from the barking ring, and electrical conducting means operatively connecting said electrical control means and said electrically-driven fluid supply means for effecting actuation of said electrically-driven fluid supply means by operation of said electrical control means and including rotary electrical conducting means bridging between the log barker frame and the barking ring.

8. The remotely controllable force mechanism defined in claim 7, in which the rotary electrical conducting means includes slip rings carried by the barking ring and brushes carried by the frame and engaging said slip rings respectively.

9. Remotely controllable force mechanism for a rotary-ring log barker having a rotary barking ring and a barking arm mounted on the ring to vary its projection into the ring aperture, comprising yieldable force-exerting means carried by the barking ring and operatively connected to urge the barking arm inward including a hydraulic arm actuator, a hydraulic liquid reservoir, pneumatic accumulator means connected to said hydraulic arm actuator, electrically-driven pump means connected between said reservoir and said hydraulic arm actuator and operable to pump liquid from said reservoir to said arm actuator for increasing the pressure therein effected by said accumulator means and electrically-controlled relief valve means connected between said arm actuator and said reservoir openable for return of liquid to to said reservoir to relieve the pressure in said arm actuator, electical control means located remote from the rotary barking ring, and electric conducting means operatively connecting said electrical control means, said electrically-driven pump means and said electrically-controlled relief valve means for effecting, by operation of said electrical control means, selective actuation of said electrically-driven pump means to increase the force urging the barking arm inward and of said electrically-controlled relief valve means to reduce the force urging the barking arm inward.

10. Remotely controllable force mechanism for a rotary-ring log barker having a frame, a barking ring rotatively mounted therein and a plurality of pairs of barking arms mounted on the ring to vary their projection into the ring aperture, the arms of each pair being mounted in diametrically opposite positions, comprising yieldable force-exerting means carried by the barking ring including hydraulic arm actuators, one for each barking arm, and operatively connected to the respective barking arms to urge them inward, an annular hydraulic liquid reservoir mounted on the barking ring concentrically thereof, pneumatic accumulator means connected to said hydraulic arm actuators, conduit means connecting together the arm actuators for each pair of arms and separated from the conduit means for the other arm actuators, electrically-driven pump means connected between said reservoir and said hydraulic arm actuators and operable to pump liquid from said reservoir to said arm actuators for increasing the pressure therein effected by said accumulator means, electrically-controlled relief valve means connected between said arm actuators and said reservoir openable for return of liquid to said reservoir to relieve the pressure in said arm actuators, electrical control means located remote from the rotary barking ring, and electric conducting means operatively connecting said electrical control means, said electrically-driven pump means and said electrically-controlled relief valve means for effecting, by operation of said electrical control means, selective actuation of said electrically-driven pump means to increase the force urging the barking arms inward and of said electrically-controlled relief valve means to reduce the force urging the barking arms inward, and including slip rings carried by the barking ring and brushes carried by the frame and engaging said slip rings respectively.

References Cited
UNITED STATES PATENTS 3,137,329  6/1964  Smith _____ 144—208

WILLIAM W. DYER, Jr., *Primary Examiner.*

W. D. BRAY, *Assistant Examiner.*